(12) United States Patent
Wolf (10) Patent No.: US 9,062,984 B2
(45) Date of Patent: Jun. 23, 2015

(54) TECHNIQUE FOR PROCESSING CARTOGRAPHIC DATA FOR DETERMINING ENERGY-SAVING ROUTES

(71) Applicant: ELEKTROBIT AUTOMOTIVE GmbH, Erlangen (DE)

(72) Inventor: Joerg Wolf, Nuremberg (DE)

(73) Assignee: ELEKTROBIT AUTOMOTIVE GmbH, Erlangen (DE)

( * ) Notice: Subject to any disclaimer, the term of this patent is extended or adjusted under 35 U.S.C. 154(b) by 0 days.

(21) Appl. No.: 13/973,473

(22) Filed: Aug. 22, 2013

(65) Prior Publication Data
US 2014/0058673 A1    Feb. 27, 2014

(30) Foreign Application Priority Data

Aug. 23, 2012 (DE) .......... 10 2012 016 768

(51) Int. Cl.
*G01C 21/34* (2006.01)
*G01C 21/36* (2006.01)
*G01C 21/20* (2006.01)
*G08G 1/0968* (2006.01)

(52) U.S. Cl.
CPC .......... *G01C 21/3469* (2013.01); *G01C 21/20* (2013.01); *G08G 1/096838* (2013.01); *G01C 21/3484* (2013.01); *G01C 21/3492* (2013.01); *G01C 21/3617* (2013.01); *G08G 1/096844* (2013.01); *B60L 2260/54* (2013.01); *B60W 2540/30* (2013.01)

(58) Field of Classification Search
CPC ............... G01C 21/3469; G01C 21/20; G01C 21/3484; G01C 21/3617; G01C 21/3492; B60W 2540/30; G08G 1/096838; G08G 1/096844; B60L 2260/54
USPC ......... 701/408–411, 420, 421, 424, 123, 532, 701/533; 340/439; 73/114.52, 114.53
See application file for complete search history.

(56) References Cited

U.S. PATENT DOCUMENTS

| 5,913,917 | A  | * | 6/1999 | Murphy ................ 701/123 |
| 7,260,473 | B2 | * | 8/2007 | Abe et al. ............. 701/420 |
| 7,512,487 | B1 | * | 3/2009 | Golding et al. ........ 701/424 |
| 2008/0042489 | A1 | * | 2/2008 | Lewis et al. ......... 303/152 |

(Continued)

FOREIGN PATENT DOCUMENTS

| DE | 10 2010 017 485 A1 | 5/2011 |
| DE | 10 2010 053 489 B3 | 9/2011 |
| DE | 10 2010 027 777 A1 | 10/2011 |
| DE | 10 2010 062 252 A1 | 1/2012 |
| DE | 10 2010 047 080 A1 | 4/2012 |

*Primary Examiner* — Russell Frejd
(74) *Attorney, Agent, or Firm* — Westerman, Hattori, Daniels & Adrian, LLP (57) ABSTRACT

A technique is described for determining an energy-saving route between two geographic positions on the basis of predefined cartographic data, the cartographic data describing a real traffic route network in the form of route segments and route nodes. A method aspect comprises the steps of subdividing the route segments provided for a route calculation into route segment portions that each have a predefined speed profile, providing an energy consumption value to be expected for each of the route segment portions, on the basis of the respectively assigned speed profile, and calculating weights for the respective route segments on the basis of the energy consumption values provided for the route segment portions, wherein the weights can be used to determine the energy-saving route in the context of the route calculation.

18 Claims, 5 Drawing Sheets

(56) References Cited

U.S. PATENT DOCUMENTS

| | | | |
|---|---|---|---|
| 2010/0106603 A1* | 4/2010 | Dey et al. | 705/14.63 |
| 2010/0299056 A1* | 11/2010 | Mueller et al. | 701/200 |
| 2011/0106419 A1 | 5/2011 | Kim | |
| 2011/0309926 A1* | 12/2011 | Eikelenberg et al. | 340/439 |
| 2012/0022781 A1* | 1/2012 | Wilson | 701/410 |

* cited by examiner

TECHNIQUE FOR PROCESSING CARTOGRAPHIC DATA FOR DETERMINING ENERGY-SAVING ROUTES

TECHNICAL FIELD

The present disclosure relates in general to the determination of energy-saving routes. In particular, it specifies a technique for determining energy-saving routes on the basis of suitably processed geographic data.

BACKGROUND

Methods for calculating routes, between two or more predefined geographic positions (e.g. by input of start point, destination point and/or intermediate destinations), are generally known. In these cases, calculated routes are normally determined as graphs of nodes and route segments, wherein, frequently, intersections or junctions correspond to the nodes, and portions between adjacent intersections or junctions correspond to the route segments.

Route segments and nodes may be described more fully by additional attributes that indicate, for example, a length of portions, a portion type, a maximum allowable travel speed, a direction of travel, type of intersection, etc. A route segment algorithm can use these attributes to determine weights for individual route segments, on the basis of which the optimum route is calculated. However, such weights can also be already fixedly assigned to the route segments and nodes in the cartographic data.

Frequently, search algorithms implement various search options, according to which it is possible to search for an optimized route between two selected positions. For example, selection of the option "fastest route" results in searching for a route having the shortest travel time, which does not necessarily at the same time have to be the route having the shortest distance. Such a refined search is made possible in that the route search algorithm gives preference, for example, to route segments for motorway portions over other route segments of the road network, appropriately modifying the weights of these portions (increasing or reducing them, according to the algorithm). Depending on the search option selected, a user can thus effect a search for a route, between two or more positions, that satisfies the quite particular travel criteria.

Known from DE 10 2010 027 777 A1 is a method for determining a consumption-optimized route between a start point and a destination point, in which energy consumption information is assigned to each route portion. The energy consumption information represents an additional consumption of energy relative to a minimum energy consumption, the energy consumption information being able to comprise a plurality of energy consumption values, which take account of a traffic flow characteristic on the assigned route portions. The energy consumption information is stored, together with the route portions, in a database.

The determination of a consumption-optimized route is additionally known from DE 10 2010 053 489 B3. In that case, a plurality of routes determined between a start point and a destination point are evaluated according to ecological criteria. The estimated fuel consumption for the routes is determined by means of a stored fuel consumption function, which specifies a minimum consumption in dependence on the speed.

Common to the known methods for determining a consumption-optimized route is the fact that they are based on partially simplified consumption models, and therefore frequently give only a rough prediction relating to energy-saving routes. On the other hand, the implementation of detailed consumption models that take account of, for example, characteristics of the traffic-route network, driver habits, vehicle parameters and a traffic situation, requires large amounts of computing capacity.

SUMMARY

A technique is therefore to be provided which, in a manner that is flexible and sparing of resources, makes it possible to determine an energy-saving route that takes account of factors contributing to energy consumption, without at the same time significantly impairing the speed of the search operation.

Specified for this purpose is a computer-assisted method for processing cartographic data for the purpose of determining an energy-saving route between two geographic positions, the cartographic data representing a real traffic-route network in the form of route segments and route nodes, and the method comprising the following steps: subdividing the route segments provided for a route calculation into route segment portions that each have a predefined speed profile; providing an energy consumption value to be expected for each of the route segment portions, on the basis of (at least) the respectively assigned speed profile; and calculating weights for the route segments on the basis of the energy consumption values provided for the route segment portions, wherein the weights can be used to determine the energy-saving route in the context of the route calculation.

Within the scope of the present disclosure, a weight is not necessarily to be understood in connection with its use in the context of a multiplication. Rather, weights may also be processed on the basis of other computing operations. Furthermore, an energy consumption value may denote, quite generally, a value having a relationship to the energy use for travelling a particular route segment portion.

The speed profile respectively constituting the basis of the route segments may represent the speed progression of a travel speed during travel along a route segment portion corresponding to the route segment. Each route segment of the cartographic data can therefore be linked to a speed profile that indicates a travel speed within the corresponding route segment, the travel speed being able to change within the route segment. Thus, the speed progression assigned to a route segment can represent a variable quantity, having portions of increasing, decreasing and/or (substantially) constant speed. Portions of increasing speed can be linked to a (vehicle) acceleration operation, portions of constant speed can be linked to a uniform (non-accelerated) motion, and portions of decreasing speed can be linked to a (vehicle) deceleration operation.

A route segment can be subdivided into route segment portions on the basis of its speed profile, a speed profile portion having (e.g. a predefined) speed profile corresponding to each portion. Optionally, a speed profile having either a constant speed progression or a steady (for example, even) speed change (according to a vehicle acceleration or a vehicle deceleration) can correspond to each route segment portion. Thus, each speed profile of a route segment portion can represent quite particular travel states (e.g. travel with positive or negative acceleration or with a constant travel speed). The number of subdivisions of a route segment, and therefore the number of route segment portions obtained, can therefore depend on the number of speed profile portions, representing a particular travel state that can be assigned to the speed profile of a route segment. Thus, one, two, three or more route segment portions can be determined per route segment.

Each route segment portion can be defined by an initial and end speed of the predefined speed profile assigned to the route segment portion. In the case of a route segment portion having a constant speed profile, the absolute values of the initial and end speed at the start and end of the portion are substantially equal in any case. In the case of an acceleration/deceleration, the absolute speed value at the start of the portion is sufficiently smaller/larger than the absolute speed value at the end of the portion, the speed being able to change evenly within the portion. It is also conceivable for the change in speed within a portion to have the same preceding sign (corresponding to an acceleration or a deceleration), but not to progress evenly (e.g. linearly), and to follow, for example, an exponential law.

The energy consumption value to be expected for a route segment portion can be provided in that an energy consumption value assigned to the speed profile of the portion is read out from at least one assignment table. For this purpose, the at least one assignment table can comprise previously calculated energy consumption values for predefined speed profiles, which can be unambiguously defined, for example, by a start speed and an end speed. It is therefore possible to dispense entirely, or at least partially, with an explicit calculation of energy consumption values during a route search operation on the basis of determined speed profiles and further model-dependent parameters (e.g. vehicle parameters).

The energy consumption values can be calculated in dependence on a multiplicity of predefined speed profiles, and organized and stored in the at least one assignment table. Like the cartographic data, the at least one assignment table can be stored beforehand in a database of a navigation device. As an alternative to this, the at least one assignment table can be generated or updated upon startup of the navigation device. The at least one assignment table can then be buffered or stored in the database or a buffer for the calculation of weights.

Depending on the energy consumption model on which the calculation of the energy consumption is based, the energy consumption values can comprise, in addition to an energy component that comprises the energy consumption of a vehicle (or vehicle engine) in idling operation, at least one kinetic energy component that is dependent on the predefined speed profile, an air-flow resistance energy component, a frictional loss component and/or a potential energy component. It is understood that the individual energy components can be organized in one or more assignment tables. It is also understood that energy components that are non-dependent on a speed profile can have been determined directly during the search operation, and therefore need not be stored beforehand in an assignment table.

The method can additionally comprise the determination of speed profiles on the basis of cartographic data assigned to the route segments and route nodes. For this purpose, at least one parameter assigned to the route segments, such as, for example, a length of the route segment, a maximum allowable travel speed, a segment type, a traffic situation, etc. can be used to calculate speed profiles. Further, stop points, information relating to descending gradients, ascending gradients and/or figures relating to the number and geometry of bends can be included in the calculation of speed profiles. It is also conceivable for previously calculated speed profiles to be provided, with the cartographic data, for each of the route segments.

The calculation of the speed profile can also include as a basis a driver profile that quantitatively reflects the driving habits of a driver. It is conceivable that the driver profile can be determined individually, from collected travel data. Such travel data can include information relating to the acceleration behaviour (e.g. the manner of deceleration and acceleration). It is also conceivable that a driver profile can be selected by a driver from a plurality of previously stored profiles. In this case, it is possible to use, for example, pre-set vehicle profiles that are used or provided by vehicle manufacturers in the course of an engine control operation or a brake system control operation.

The weight of a (each) route segment can be calculated from a sum of the energy consumption values provided for the respective route segment portions of the route segment. The weight can represent the sum of the energy consumption values, or correlate with the calculated sum value. It is conceivable, for example, for the weight to increase proportionally or over-proportionally with the sum value. An over-proportional increase can have the effect that route segments that have a high energy consumption are penalized particularly highly, and are therefore not taken into account in the calculation of a route. The thus calculated weight can represent a basic weight for each route segment. This basic weight can be calculated during the route calculation (by means of a weighting algorithm). If information relating to vehicle parameters and a driver profile are known, it is then also conceivable for the basic weights for the entire road network, stored in the form of cartographic data, or for parts thereof to be calculated in advance and stored. The weights calculated in advance can then be called up and processed further, together with other cartographic data, during calculation of a route.

It is additionally possible to add to the basic weight of a (each) route segment a weight component that indicates an energy consumption that must be additionally expended during the transition between the route segment and a route segment succeeding the route segment, owing to possible differing speed values in the respective speed profile at the transition. For this purpose, for example, the speed values that are assignable to the two succeeding route segments (or the respective end and start portions of the two succeeding route segments) are first compared with each other. On the basis of the comparison, it is then possible to calculate an energy consumption value that corresponds to an energy for accelerating a vehicle from a first speed of the corresponding route segment (i.e., of the preceding route segment) to a second speed, of the subsequent route segment. On the other hand, the calculation of the energy consumption value can be effected in that an energy consumption value corresponding to the difference in speed between the end portion of the preceding route segment and the start portion of the subsequent route segment is read out from a previously stored assignment table. An (additional) weight for the transition between a preceding and a subsequent route segment can thus then be calculated on the basis of the additionally calculated energy consumption value, the additional weight being in each case added to the basic weight of the preceding route segment (e.g. applied to the basic weight or subtracted from the basic weight).

It is understood that, depending on the speed value of the preceding and subsequent route segment (route segment portions) at the route-segment transition (i.e. at the route node), there may be an increase or a reduction in speed that, in turn, leads to a vehicle acceleration or a vehicle deceleration (braking). If a vehicle comprises an energy recovery system, then, instead of an additional energy consumption, energy may even be recovered in the case of a deceleration at a transition between adjacent route segments. Correspondingly, the additional weight can then assume a negative value, or be subtracted from the basic weight of the route segment.

Furthermore, for the calculation of energy-saving routes, the route nodes can be provided with weights that take account of an energy consumption of manoeuvres at the route nodes. For example, a manoeuvre at one node may be more favourable, in respect of energy, than another manoeuvre at the same node (e.g. turning right, as compared with turning left). In addition or as an alternative to this, the type of road intersection (e.g. crossroads with traffic lights, roundabout, etc.) may directly affect the energy consumption. Accordingly, each route node can be assigned at least one weight that takes account of the energy consumption of a possible manoeuvre at the road intersection, and that is additionally taken into account in the calculation of a route.

Also provided is a computer program product having program code for executing the method described here, the computer program product being implemented on a computer device (e.g. a navigation device). For this purpose, the computer program product can be stored on a computer-readable recording medium (e.g. a memory card or a fixed memory).

Additionally provided is an apparatus for processing cartographic data for the purpose of determining energy-saving routes between two geographic positions, the cartographic data representing a real traffic-route network, in the form of route segments and route nodes, and the apparatus comprising: a storage unit for storing at least the cartographic data; a device for subdividing the route segments provided for a route calculation into route segment portions that each have a predefined speed profile; a device for providing an energy consumption value to be expected for each of the route segment portions, on the basis of (at least) the respectively assigned speed profile; and a device for calculating weights for the route segments on the basis of the energy consumption values provided for the route segment portions, wherein the weights can be used to determine the energy-saving route in the context of the route calculation.

The apparatus can further comprise a device for determining an energy-saving route on the basis of the cartographic data and the calculated weights. In addition or as an alternative to this, the apparatus can comprise a device for providing speed profiles. Also provided is a navigation system, which comprises the apparatus for determining an energy-saving route.

BRIEF DESCRIPTION OF THE DRAWINGS

Further details, aspects and advantages of the disclosure described here are given by the drawings that follow, wherein.

DETAILED DESCRIPTION

Figure 1:
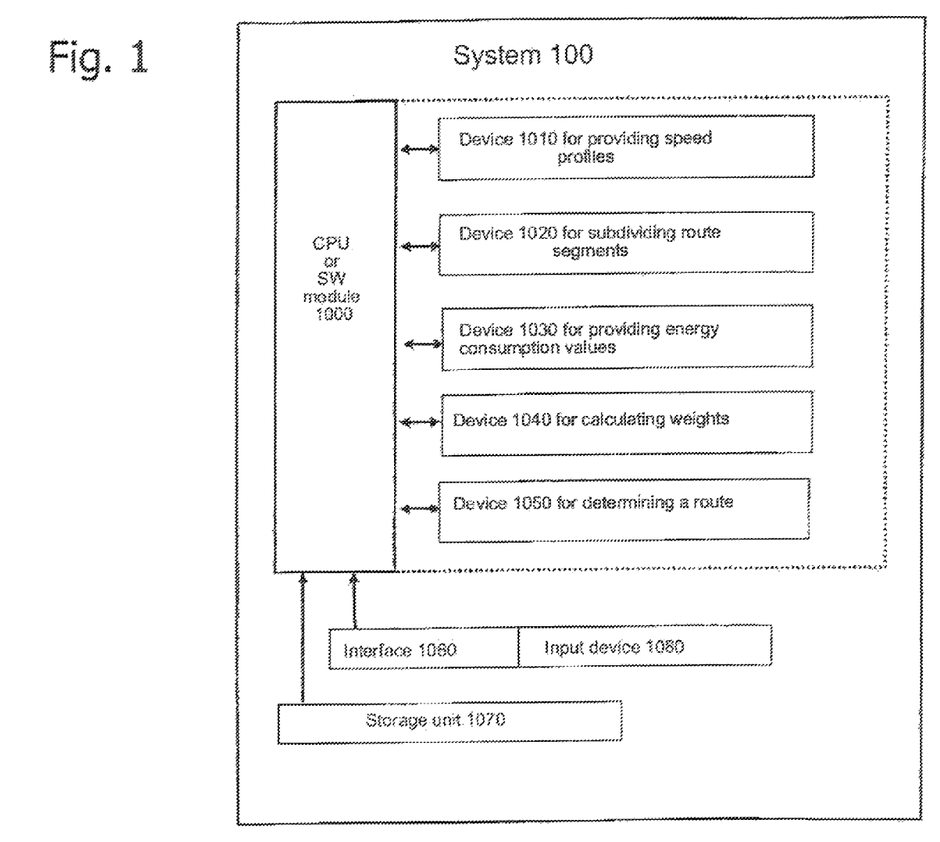
FIG. 1 shows a system according to an embodiment.

FIG. 1 shows, in the form of a block diagram, an embodiment of a system 100 for processing cartographic data for the purpose of determining an energy-saving route between two geographic positions, the cartographic data comprising route segments and route nodes of a real road network. The system can be part of a fixedly built-in navigation device, a personal digital assistant (PDA), a smartphone or a personal navigation device (PND). Although the embodiments are described in connection with a road network, the present disclosure can be applied generally in connection with traffic-route networks (e.g. also for rail networks).

The system 100 comprises a core functionality 1000 in the form of a central processing unit (CPU), a microprocessor, or in the form of a software module (SW module), a device 1010 for providing speed profiles, a device 1020 for subdividing route segments, a device 1030 for providing energy consumption values, a device 1040 for calculating weights, a device 1050 for determining an energy-saving route, and at least one interface 1060, via which data can be exchanged with the environment. The devices 1010, 1020, 1030, 1040, 1050 and 1060 can be realized as stand-alone devices or, as an alternative to this, integrated as a sub-unit or as software sub-modules in the core functionality 1000, as indicated by the broken line in FIG. 1. According to the present embodiment, the system 100 further comprises a storage unit 1070 and an input device 1080. It is also conceivable, however, that the input device 1080 and the storage unit 1070 are not part of the system, and for navigation data, or input data, to be entered via the interface 1070. The at least one interface 1060, the input device 1080 and the storage unit 1070 are communicatively connected to the core functionality 1040.

The at least one interface 1060 is provided to communicatively connect the system 100 to external control components, storage components or computing components. For example, the system 100 can be integrated as a constituent part in a vehicle navigation device and, via the interface 1060, be in communication with vehicle sensors, an engine control unit and/or a brake control unit, in order to read out vehicle data and/or data relating to driver habits (acceleration data, deceleration data). In particular, the system 100, as part of a navigation device, can be in communication with data storage devices and processors of the navigation device, in order, for example, to access cartographic data stored in the navigation device or to provide calculated weights to the navigation device. The at least one interface 1060 in this case can be realized as a hardware interface or as a software interface (application programming interface, API) or as a mixed hardware and software interface.

In the storage unit 1070, cartographic data used as a basis for calculating a route between two or more (predefinable) positions (e.g. a start point and a destination point, with optional intermediate points) are stored in at least one database DB 30 (see FIG. 4). The cartographic data comprise route segments having segment attributes, and nodes having node attributes, which can be organized in the form of relational tables. Stored attributes for the calculation of routes can in this case comprise information relating to the mean travel speed, turning manoeuvres, the road type, the road environment (e.g. urban or rural), the traffic volume (e.g. mean traffic volume, according to times of day), stop signals (e.g. traffic lights and stop signs), road inclines, relative altitude differences and/or the number and quality of road bends, depending on the type of cartographic data set used. The data within the database 30 in this case can be organized and structured according to a predefined data format. For example, the data can be organized according to the navigation data standard (NDS) format, or assume any other format.

The input device 1080 is realized to provide inputs relating to a start point (e.g. from a position sensor) and to a destination point (with optional intermediate stops) to the core functionality 1000 or to the devices 1020, 1030, 1040, 1050. Further, information relating to driving habits and/or motor-vehicle parameters (e.g. average energy consumption figures) can be provided.

The input device 1080 can also be used to perform selection operations. For example, a user can be provided with previously stored navigation options for selection, via an output device. Such selection operations can include information relation to search options. Thus, a search algorithm can perform a search according to particular criteria such as, for example, according to the criterion of the shortest distance, the fastest route or the most energy-saving route between two or more positions. Inputs in this case can be effected by actuation of input keys or a touch-sensitive screen, and/or acoustically, such as, for example, by communication of place names, road names, etc. Further, via an external position sensor or a position sensor belonging to the system 100 (which position sensor is not shown in FIG. 1), the core functionality 1000 can receive current position information, which can also define the start point.

The devices 1010, 1020, 1030, 1040 and 1050, which can be realized as software sub-modules or as hardware modules having appropriate software routines, are in mutual communication with each other and with the core functionality 1000. The functioning of each individual device 1010, 1020, 1030, 1040, 1050 is discussed in greater detail in connection with the flow diagram represented in FIG. 2.

Figure 2:
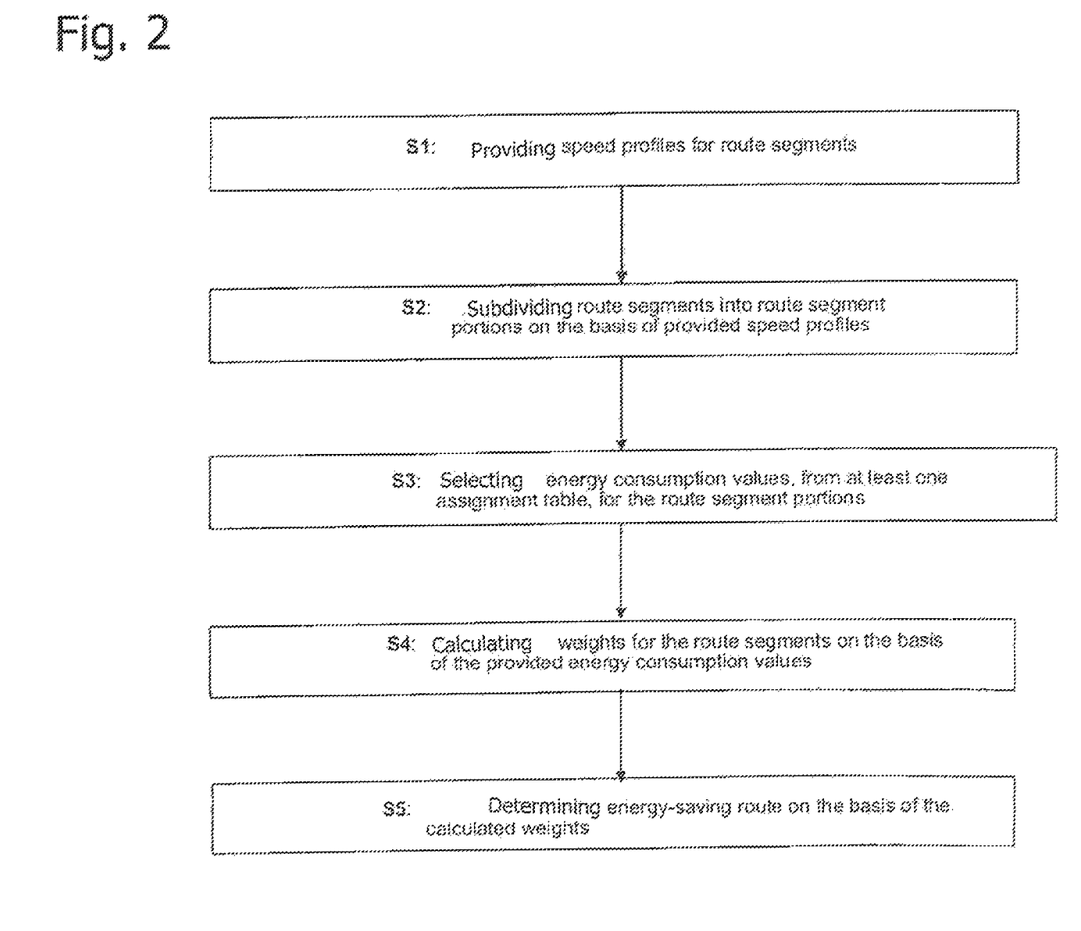
FIG. 2 shows a schematic representation of a method according to an embodiment.

The flow diagram represented in FIG. 2 shows an embodiment of a method for determining an energy-saving route, which method is now explained exemplarily on the basis of the system 100 represented in FIG. 1.

In a first step S1, a speed profile for route segments is provided by the device 1010. The device 1010 is realized to determine speed profiles for route segments on the basis of cartographic data and, if appropriate, on the basis of a driver profile. The speed profile on which the route segments are based represents the real, or expected, progression of the travel speed during travel along a portion of road corresponding to the route segments.

According to an embodiment, the speed profiles can be calculated in advance by the unit 1010, stored in the storage unit 1070 and read out for the determination of a route. As an alternative to this, the speed profiles can be determined during determination of a route and used for calculating a route according to the present method. The speed profiles determined during a route calculation can additionally be stored in the storage unit 1070, for subsequent route calculations.

Figure 3A:
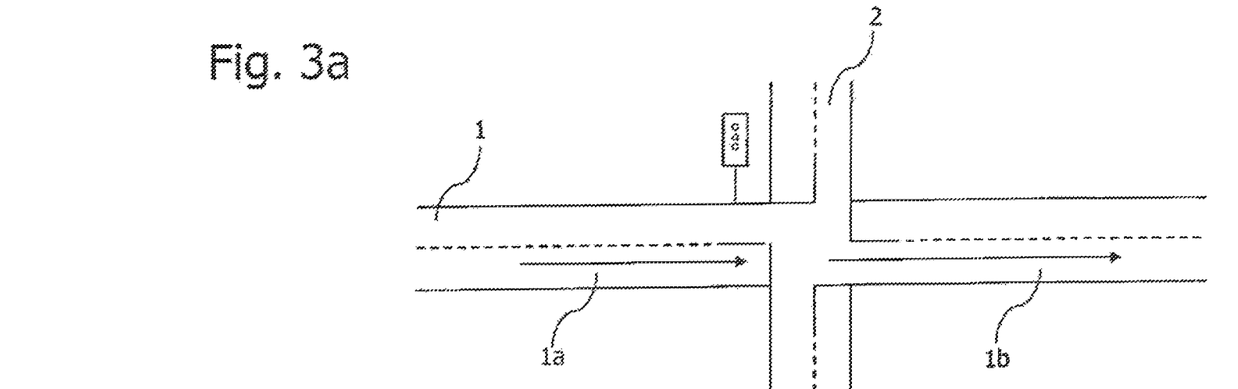
FIGS. 3*a*-3*b* show a schematic representation of the calculation of a speed profile.
Figure 3B:
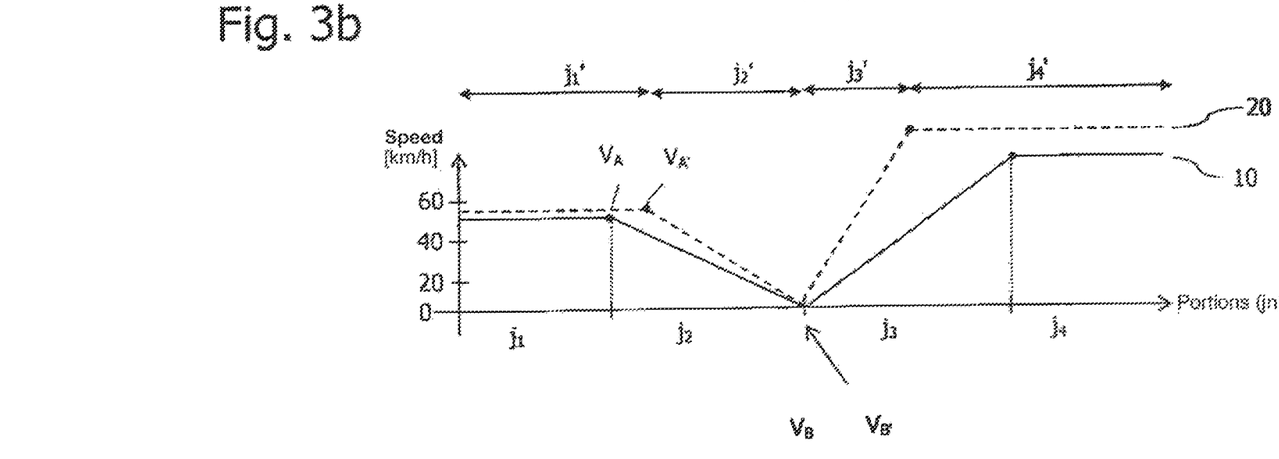

Determined speed profiles for a road portion are represented exemplarily in FIGS. 3*a* and 3*b*. FIG. 3*a* shows a part of a real road network, along which a route is guided between two points. The route to be travelled is located on road 1, which is crossed by a road 2, the traffic at the intersection of the two roads 1 and 2 being controlled by traffic lights. Represented in FIG. 3*b* are two determined speed profiles 10, 20 for the route along road 1, which represent the progression of the travel speed (ordinate) as a function of the course (abscissa) of road 1. The determination of such speed profiles 10, 20 can be effected with route segment attributes (such as, for example, road length, road type and the maximum allowable speed) and intersection attributes being taken into account.

In the present example, the determined speed profile in the direction of travel (see arrows in FIG. 3*a*, which indicate the direction of travel along the road segments) has a portion j1, j1' of constant speed, a portion j2, j2' of a decrease in speed (due to vehicle deceleration), a portion j3, j3' of an increase in speed (due to vehicle acceleration) and a further portion j4, j4' of constant speed. The absolute speed values of the portions j1, j4, j1', j4' of constant speed can correspond to the maximum allowable speeds (e.g. 50 km/h or 70 km/h) assigned to the corresponding route segments. The deceleration and acceleration portions j2, j3, j2', j3' depend on the type of intersection and the driving habits, it being assumed here that a vehicle is decelerated down to a standstill in the case of an intersection controlled by traffic lights. The length of the acceleration portions j2, j3, j2', j3' depends, in particular, on the driving behaviour of a driver (driver profile). As known empirically, in the case of a sports-type driving style, the braking distances and the acceleration distances are short (cf. speed profile 20) whereas, in the case of a defensive driving style, the acceleration and deceleration distances are longer. Short acceleration and deceleration distances are associated with a pronounced increase and decrease in speed, respectively, (and a corresponding rise) in the speed profile and, associated therewith, a relatively high energy consumption. Obviously, the speed values for the portions of constant speed depend on the driving style, and may assume values that may be higher or lower than the maximum allowable speed or than a recommended guideline speed. By taking account of driver profiles, which quantitively describe the driving style of a driver, it is thus possible to determine driver-specific speed profiles. Driver parameters in this case can be determined from collected travel data. It is also conceivable, however, for driving parameters to be determined from a driving option (e.g. normal, sports-type, ecological, etc.) that is set in the vehicle.

In addition, for the purpose of calculating speed profiles, bend properties of a road portion can be taken into account. In this case, for each route segment, the course of the road can be analyzed in respect of its bend characteristic, and the travel speed adapted according to the bend characteristic. Thus, the travel speed can be reduced before the approach to a bend, and increased again after a bend. In this way, it is possible to create for each road portion (route segment) a realistic, road-segment dependent speed profile that consists of succeeding portions of constant speed and portions having a (relative) increase or decrease in speed. Such a profile is substantially more accurate than an average travel-speed value calculated for a route segment.

Back to FIG. 2. In a second step S2, the route segments are subdivided into route segment portions, according to the speed profiles 10, 20 provided by the device 1020. The device 1020 in this case analyzes the speed changes occurring in the speed profile 10, 20 of the route segments, and subdivides the route segments into route segment portions in such a manner that a speed profile portion j1, j1', j2, j2', j3, j3', j4, j4', which has either a speed progression that is substantially constant in any case, or a decreasing or increasing speed progression, can be assigned to each portion of a route segment. In respect of the road portions 1*a*, 1*b* represented in FIG. 3*a* and the associated speed profile (FIG. 3*b*), the route segment that corresponds to the road portion 1*a* is broken down into a portion having a constant speed progression (portion j1, j1') and a portion having a decreasing speed progression (portion j2, j2'). Likewise, the route segment representing the road portion 1*b* is subdivided into a portion having increasing speed (portion j3, j3') and a portion having constant speed (portion j4, j4'). In total, each route segment can be subdivided into one or more portions, depending on the speed profile 10, 20 taken as a basis, a uniform motion or a decelerated or accelerated motion corresponding to each portion, with all route segment portions belonging to a route segment representing the respective route segment in its total length.

The advantage of such a subdivision consists in that each route segment having a given speed profile can be broken down into portions having known speed profiles (i.e. into portions having either an acceleration profile, a deceleration profile or a profile of uniform motion). These portions can thus be described by means of a speed value at the start and end of a route segment portion. In the case of a portion having a constant speed profile, the absolute values of the start and end speed $v_A$, $v_B$, $v_{A'}$, $v_{B'}$ at the start and end of the portion are equal, the speed also not changing substantially within the portion. In the case of an acceleration/deceleration, the absolute speed value $v_A$, $v_{A'}$ at the start of the portion is less/greater than the absolute speed value $v_B$, $v_{B'}$ at the end of the portion. For reasons of simplicity in the present embodiment, even (linear) speed changes are assumed within each portion. It is also conceivable for the change in speed within a portion to have the same preceding sign (i.e. acceleration or deceleration), but not to change evenly. In this case, the non-linear progression could be approximately linearly by multiple subdivision. Overall, each speed profile is unambiguously defined by its start and end speed $v_A$, $v_B$, $v_{A'}$, $v_{B'}$.

In a succeeding third step S3, corresponding energy consumption values are provided for each route segment portion j1', j2, j2', j3, j3', j4, j4' having a predefined speed profile. The provision of the energy consumption values is effected by the device 1030, which, on the basis of the start and end speeds $v_A$, $v_B$, $v_{A'}$, $v_{B'}$ of each portion, reads out corresponding precalculated energy consumption values $E(v_A, v_B)$, from at least one (two-dimensional) assignment table 60 (cf. FIG. 4). In the at least one assignment table 60, energy consumption values are stored as a function of start and end speeds $v_A$, $v_B$, $v_{A'}$, $v_{B'}$. The advantage of using an assignment table consists in that, during the calculation of an energy-saving route, energy consumption values that are as realistic as possible can be determined on the basis of speed profiles that are as realistic as possible, without a large computing resource requirement. In other words, by means of the usual hardware resources, even of a portable navigation device, an energy-saving route can be calculated just as rapidly, or only insignificantly more slowly, than a route calculated, for instance, only on the basis of the criterion of the shortest distance. For the purpose of calculating the weights, it is necessary only for assignment tables, which are stored or buffered in the storage unit 1070, to be loaded from the storage unit 1070 into a working memory of the system 100, where they are then available to the device 1030 for the selection of appropriate energy values.

It is also conceivable for differing absolute values relating to the energy consumption to be stored in differing assignment tables 60. In order to ensure flexible and simple handling of the calculation of the energy consumption values, absolute values relating to the kinetic energy, the frictional loss, the potential energy resulting from change of altitude and/or absolute values relating to the air-resistance loss can be stored in differing assignment tables, according to the energy consumption model. In particular, energy consumption values that can be assigned to portions of constant, increasing or decreasing speed can be organized into differing assignment tables. For each route segment portion, the device 1030 reads out, from the at least to one assignment table 60, the energy consumption values assigned to the speed profile, and transfers these values to the device 1040 for the purpose of calculating weights.

According to FIG. 2, in the succeeding step S4, weights for the route segments are calculated on the basis of the provided energy consumption values. For this purpose, the device 1040 calculates weights of each route segment as a sum of the absolute energy consumption values of its route segment portions. Specifically, the device 1040 determines the energy consumption of each route segment from the sum of the absolute energy values according to the step function $$E(V_A, V_B, d) = E_{LUTacc(V_A,V_B)}, E_{LUTdec(V_A,V_B)} \text{ for } V_A <> V_B$$
$$= d * E_{LUTconst}(V_A, V_B) \text{ for } V_A = V_B$$

wherein $E_{LUTacc}$ and $E_{LUTdec}$ represent energy values of acceleration portions and deceleration portions, respectively, and $E_{LUTconst}$ represents energy values for portions having a constant speed, per unit of distance. Since the energy value $E_{LUTconst}$ depends only on the absolute speed value $v_A$ (wherein $v_A = v_B$), this value can be stored, as a value that is non-dependent on distance, in the at least one assignment table 60, this value then being scaled before the addition with a corresponding distance value d. The distance value d2 corresponds to the length of the respective route segment portion. The acceleration and deceleration values $E_{LUTacc}$, $E_{LUTdec}$ can be stored, as energy values that are non-dependent on distance, in dependence on the function values $v_A$, $v_B$, in the at least one assignment table 60. In the precalculation of the acceleration and deceleration values $E_{LUTacc}$ and $E_{LUTdec}$, it is additionally possible to take as a basis a particular driver profile and/or a vehicle model, which takes into account, for example, the degree of deceleration/acceleration (and therefore required deceleration and acceleration distance).

The weight calculated separately in such a manner for each route segment therefore corresponds to the sum over the energy consumption values calculated for the route segment portions of each route segment. As an alternative to this, the weight calculated for each route segment can represent a value that has a predefined functional relationship to the calculated sum value. It is conceivable, for example, for the weight (or the absolute value of the weight) to increase proportionally or over-proportionally with the sum value. An over-proportional increase can have the effect that route segments that have a high energy consumption are penalized particularly highly. During a route calculation, the weight assigned to a route segment determines whether the route segment is penalized or given preference, as compared with adjacent route segments, in the calculation of a route. In this case, depending on the search algorithm used, the calculated weight can have positive or negative values. It is not the actual calculation of the weights in dependence on the energy values assigned to the route segments that is important in this case. What is substantive is that the calculated weights scale with the calculated energy consumption values, and route segments having an expected high/low energy consumption are correspondingly penalized/preferred by means of the determined weights.

The weights calculated on the basis of speed profiles assigned to the route segments can be calculated independently (i.e. without taking account of possible succeeding route segments that could become possible for a route) for each route segment. They represent a basic weight for each route segment. Such basic weights are route-segment specific, and can be calculated directly during the route calculation, or also beforehand, and stored, together with the navigation data (e.g. map data) in a database. What is substantive, however, is that these basic weights do not take account of the energy that must be expended, for example, in order to accelerate a vehicle from a first speed (in the following, termed speed $v_A$) to a second speed (in the following, termed speed $v_B$) at an intersection or junction in the case of a transition from a travelled road portion (in the following, termed preceding route segment) to a succeeding road portion (in the following, termed subsequent route segment).

It is understood in connection with this that, irrespective of the preceding route segment from which an intersection is approached, and of the subsequent route segment via which the intersection is exited, quite different energy consumption values may be obtained for a transition effected at the intersection, depending on the speed profiles provided for the individual route segments. For example, if the value of the speed $v_B$ assigned to the subsequent route segment (or its start portion) is greater than the speed value $v_A$ assigned to the preceding route segment (or its end portion), energy is additionally required for a vehicle acceleration at the transition. On the other hand, if the speed value $v_B$ is less than the speed value $v_A$, no additional acceleration energy is consumed, in the case of a corresponding deceleration operation (vehicle braking) at the transition. Rather, in the case of the corresponding braking operation, kinetic energy is dissipated in the form of heat.

If the vehicle comprises an energy recovery system that, for example, can convert kinetic energy in the braking operation into electrical energy, the braking operation can even result in the recovery of energy. Such an energy recovery can then be taken into account in route calculation in that a (negative) weight value corresponding to the energy recovery value is provided, or is subtracted from the basic weight of the route segments.

FIGS. 4a to 4d show an embodiment illustrating how additional energy consumption values at the transition between adjacent route segments are included in the calculation of the route weights.

Figure 4A:
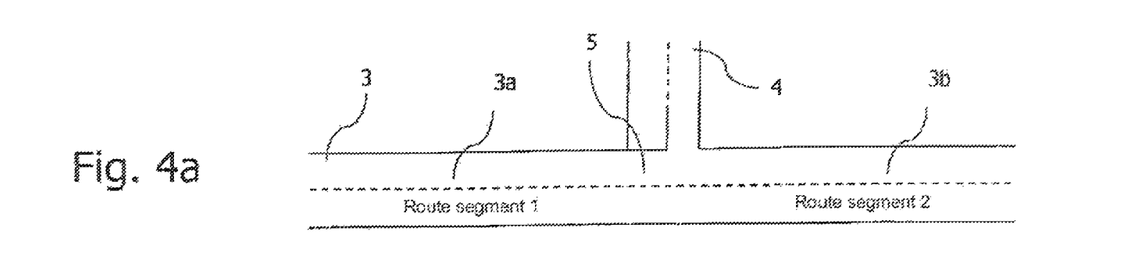
FIGS. 4*a*-4*d* show a schematic representation for the calculation of weights.

FIG. 4a shows, exemplarily, a portion of a real road network, along which a route is guided between two points. The route to be travelled is on a first road 3, which is crossed by a second road 4, the route along a first road portion 3a leading to an intersection 5. At the intersection 5, the route is guided further along a second road portion 3b, which succeeds the first road portion 3a.

Figures 4B, 4C:
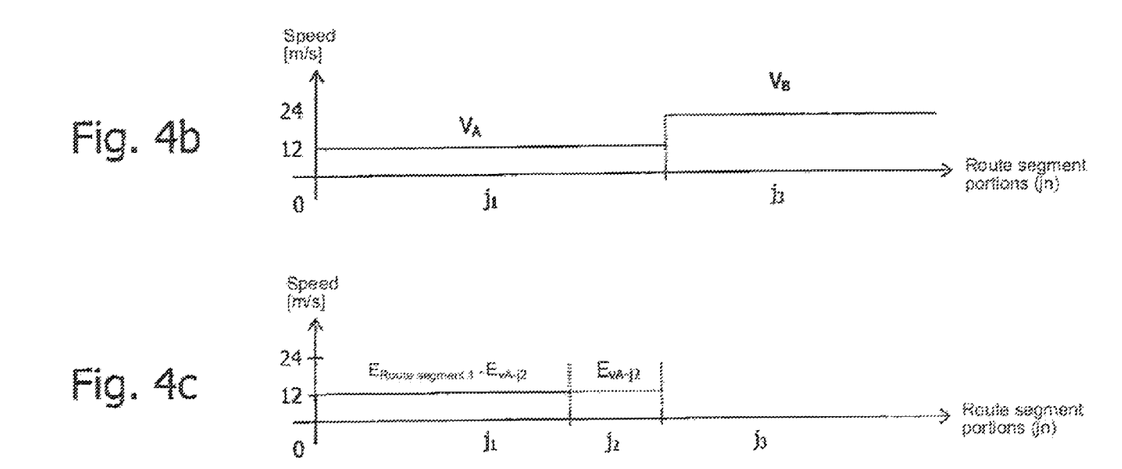
Figure 4D:
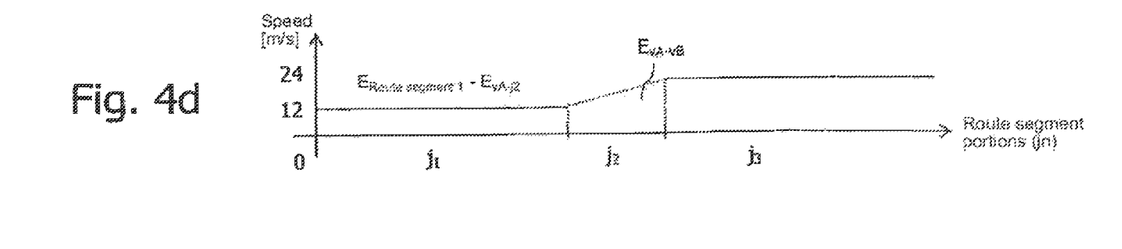

In FIGS. 4b to 4d, the calculation of energy consumption values and weights for the route segments (route segment_1 and route segment_2 in FIG. 1a) corresponding to the two road portions 3a and 3b is illustrated in greater detail, with the energy consumption at the road transition at the intersection 5 additionally being taken into account.

FIG. 4b shows, firstly, the speed profile of the route segments assigned to the two road portions 3a, 3b. The speed profiles of the two route segments have an approximately uniform speed progression, a guide speed (or setpoint speed) of 12 m/s being assigned to the speed profile of the route segment_1, and a guide speed (or setpoint speed) of 24 m/s being assigned to the speed profile of the route segment_2. The speed values specified are for explanatory purposes only. It is understood that the precise speed values depend on the road conditions.

Irrespective of the speed progressions of adjacent route segments or the route segment portions thereof, the devices 1030 and 1040 calculate a respective basic weight for each of the two route segments, in that, as already stated above, for individual route segment portions, on the basis of speed profiles, energy consumption values are read out from assignment tables and added up. In the present case, for the route segment_1, the devices 1030 and 1040 merely have to read out, from the assignment table, an energy consumption value $E_{LUTconst}(v_A, v_A)$, with $v_A$=12 m/s and scale it with the length d in order to obtain the energy consumption value $E_{Route\ segment\_1}$ (and therefore a basic weight for the route segment_1). The same applies, correspondingly, to the calculation of the basic weight of the route segment_2.

As can be seen from FIG. 4b, however, at the intersection point 5 there is a discontinuous transition in the speed progression between the route segment_1 and route segment_2. In other words, at the transition from the road portion 3a to the road portion 3b, a driver will wish to further accelerate the vehicle from the speed $v_A$=12 m/s to the speed $v_B$=24 m/s. According to the present invention, the energy consumption that ensues, in the transition from the route segment_1 to the route segment_2, in order to further accelerate the vehicle from the speed of 12 m/s to the predefined speed of 24 m/s is taken into account in that the additional energy consumption $E_{VA\_VB}$ for the acceleration at the transition from route segment_1 to route segment_2 is added to the calculated energy consumption value (or basic value) of the route segment_1 (cf. FIG. 4).

This is effected in that the devices 1020 and 1030 first, taking account of the speed values of the route segment_1 and the route segment_2 at the intersection, determine a speed difference $v_A - v_B$, and (if appropriate, taking account of a driver profile) a route segment portion j2, which corresponds to a road portion length required for the provided acceleration (or deceleration). The route segment portion j2 is added to the route segment_1, at the segment end thereof. As can be seen from FIG. 4c, the route segment_1 is now broken down into a segment portion j1, having a uniform speed progression, and a portion j2 at the end of the route segment, having an increasing speed progression (increase from $v_A$ to $v_B$). Further, the device 1030, as in the case of calculation of energy components during an acceleration or deceleration phase within a route segment, determines the energy consumption $E_{VA\_VB}$ additionally required for the transition, in that it reads out corresponding energy values $E_{LUTacc}(v_A, v_B)$ from the assignment tables provided for the acceleration portions and deceleration portions.

The determined additional energy consumption $E_{VA\_VB}$ is then added to the last route segment portion $j_2$ of the route segment_1. Since the energy value read out from the assignment table already comprises the energy component $E_{vA-j2}$ for the basic weight in the portion $j_2$, and the basic weight for the route segment_1 $E_{Route\ segment\_1}$ has been calculated for the segment portions j1 and j2, (cf. FIGS. 4b and 4c), the basic-weight energy component $E_{vA-j2}$ for j2 is subtracted from the calculated basic weight $E_{Route\ segment\_1}$ (Cf. FIG. 4c). The subtraction of the basic-weight component $E_{vA-j2}$ from the calculated basic weight $E_{Route\ segment\_1}$ is of particular interest if, as mentioned briefly above, the route-segment specific basic weights have been precalculated and stored, and then only the energy consumption values for the transitions between the route segments are calculated "on the fly" during the route calculation. If both basic weights and the transition weights are determined during the route calculation, a basic weight for the route segment_1, which excludes the last route segment portion j2, can thus be calculated directly.

Overall, for the route segment_1, an energy consumption value is obtained which takes account of the energy consumption resulting from a transition to a subsequent route segment, and which is composed of a basic-weight component and an energy consumption component that ensues from the transition between two adjacent route segments, according to the relationship:

$$E_{Route\ segment\_1'} = E_{Route\ segment\_1} + E_{VA\_VB} - E_{vA-j2}$$

Irrespective of the example shown in FIGS. 4a-4d, the transition component for energy consumption occurring at route nodes (or road intersections) is in each case added to the preceding route segment of two succeeding route segments.

Further, the device 1040 is realized to provide weights for route nodes. For this purpose, the device 1040 reads out attributes, assigned to the nodes, that describe, for instance, approached intersections or junctions in greater detail (e.g. crossroads with traffic lights, roundabout, etc.), and assigns a weight to them. Thus, owing to possible longer wait times because of a red signal, intersections controlled by traffic lights may be penalized, in comparison with a roundabout, by corresponding weights. Further, differing manoeuvres may be weighted differently at a route node. For example, a right turn manoeuvre may be more favourable than a left turn manoeuvre at an intersection, in respect of the energy consumption. Accordingly, in comparison with a right turn manoeuvre, the weight penalty is applied to a left turn manoeuvre. At least one weight that takes account of possible manoeuvres at the road intersections is thus assigned to the route nodes.

In a further step S5, finally, an energy-saving route is determined by the unit 1050 on the basis of the calculated weights. The unit 1050 reads out the route segments and route nodes, together with their calculated weights, and determines an energy-saving route between at least two predefined positions, in that it minimizes the sum of weights of possible route segment combinations.

Figure 5:
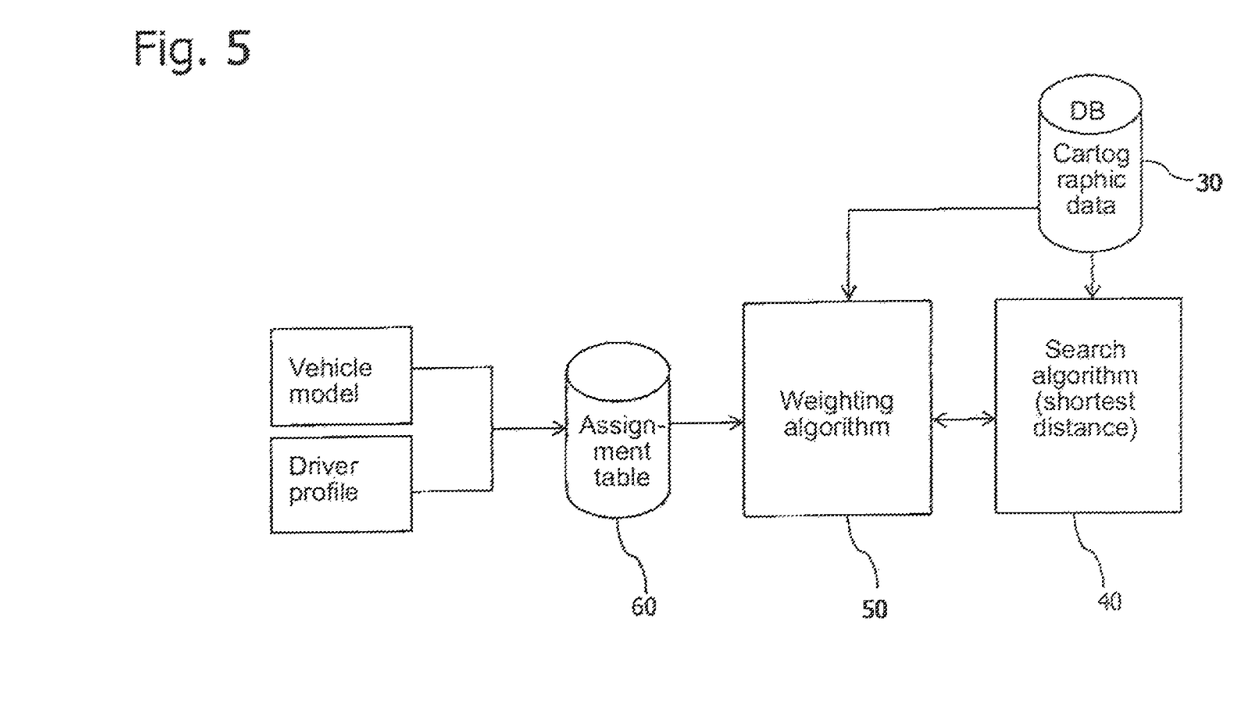
FIG. 5 shows a schematic representation of an exemplary implementation for the calculation of an energy-saving route.

In conclusion, the calculation of an energy-saving route on the basis of calculated weights that indicate an energy consumption is explained in greater detail on the basis of the exemplary implementation shown schematically in FIG. 5.

According to this figure, the determination of an energy-saving route is based on a combined use of a search algorithm 40, which determines the shortest distance between two positions (e.g. the Dijkstra algorithm), and a weighting algorithm 50, which performs a weighting of route segments and route nodes according to the expected energy consumption. The weighting algorithm 50—as already explained above in connection with the method steps in FIG. 2—divides route segments into portions, to which a respective speed profile, having either a constant, decreasing or increasing speed, can be assigned, the speed profile of the portions being unambiguously defined by means of the start and end speed $v_A$, $v_B$. The weighting algorithm 50 then makes use of at least one assignment table 60, which comprises precalculated energy consumption values (these values can be precalculated with the aid of a vehicle model and/or a driver profile) in dependence on start and end speed values $v_A$, $v_B$, and selects assigned energy consumption values for the respective portions of a route segment. Further, for each route segment, the weighting algorithm 50 calculates an energy consumption value from the energy consumption values of its route segment portions, and from this energy consumption value calculates a route segment weight. The weight is transferred to the search algorithm 40, which then determines an energy-saving route on the basis of the cartographic data and the provided complementing weights.

A realistic energy consumption value can be determined on the basis of the speed profiles assigned to the individual route segments. An aspect in this case is that the calculated speed profile for route segments is broken down into predefined speed profiles of the route segment portions, these predefined speed profiles being assignable to precalculated energy consumption values. The energy consumption values assigned or assignable to the portions are then used for calculating the weights of each route segment.

Overall, the technique described here enables energy-saving routes to be determined in rapid manner that is sparing of resources, on the basis of energy consumption models that are as realistic as possible. The technique can be applied in ordinary navigation devices having standard hardware resources, the calculation of energy-saving routes being as rapid, or only insignificantly slower, than conventional route calculations on the basis of the criterion of the shortest distance.

The invention claimed is:

1. A computer-assisted method for processing cartographic data for the purpose of determining an energy-saving route between two geographic positions, the cartographic data representing a real traffic-route network in the form of route segments and route nodes, and the method comprising the following steps:
   subdividing the route segments provided for a route calculation into portions that each have a predefined speed profile;
   providing an energy consumption value to be expected for each of the route segment portions, on the basis of the respectively assigned speed profile; and
   calculating weights for the respective route segments on the basis of the energy consumption values provided for the route segment portions, wherein the weights are usable to determine the energy-saving route during the route calculation.

2. The method according to claim 1, wherein the route segments are subdivided on the basis of speed profiles provided for the route segments, wherein each route segment portion corresponds to a speed profile, having either a constant speed or a steady change in speed.

3. The method according to claim 1, wherein the energy consumption value to be expected for a route segment portion is provided in that an energy consumption value corresponding to the speed profile is read out from at least one assignment table.

4. The method according to claim 1, further comprising pre-calculating energy consumption values in dependence on the predefined speed profiles and organizing the pre-calculated energy consumption values and the associated speed profiles in at least one assignment table.

5. The method according to claim 1, wherein the speed profiles are calculated from the cartographic data assigned to the route segments and to route nodes.

6. The method according to claim 5, wherein the calculation of the speed profiles additionally has as a basis a driver profile that quantitatively reflects the driving habits of a driver.

7. The method according to claim 6, wherein the driver profile is determined individually, from collected travel data.

8. The method according to claim 6, wherein the driver profile is selectable by a driver from a plurality of previously stored profiles.

9. The method according to claim 1, wherein the speed profiles are stored in advance, together with the cartographic data.

10. The method according to claim 1, wherein the calculation of the weights further comprises calculating at least one basic weight for a route segment from a sum of the energy consumption values provided for the respective route segment portions of the route segment.

11. The method according to claim 10, wherein the calculation of the weights for a route segment along a possible route further comprises:
   calculating an additional energy consumption value on the basis of a comparison of speed values of two succeeding route segments, at their transition, the additional energy consumption value indicating an energy consumption for passing from a preceding route segment having a predefined first speed value to a subsequent route segment having a predefined second speed value; and adding a weight, determined on the basis of the additional energy consumption value, to the basic weight of the preceding route segment.

12. The method according to claim 1, further comprising providing weights for the route nodes, which weights additionally take into account of the energy consumption of manoeuvers at the route nodes.

13. A computer program product having program code for executing the method according to claim 1, when the computer program product is implemented on a computer device.

14. The computer program product according to claim 13, which is stored on a non-transitory computer-readable recording medium.

15. An apparatus of processing cartographic data for the purpose of determining an energy-saving route between two geographic positions, the cartographic data representing a real traffic-route network in the form of route segments and route nodes, the system comprising:

a storage unit for storing at least the cartographic data;

a device for subdividing the route segments provided for a route calculation into route segment portions that each have a predefined speed profile;

a device for providing an energy consumption value to be expected for each of the route segment portions, on the basis of the respectively assigned speed profile; and a device for calculating weights for the respective route segments on the basis of the energy consumption values provided for the route segment portions, wherein the weights are usable to determine the energy-saving route in the context of the route calculation.

16. The apparatus according to claim 15, further comprising a device for determining an energy-saving route on the basis of predefined cartographic data and calculated weights.

17. The apparatus according to claim 15, further comprising a device for providing speed profiles.

18. A navigation device comprising the apparatus according to claim 15.

* * * * *